T. L. BURTON.
BALANCING DEVICE FOR BRAKE HEADS.
APPLICATION FILED MAR. 4, 1916.

1,199,872.

Patented Oct. 3, 1916.
2 SHEETS—SHEET 1.

INVENTOR
Thomas L. Burton.
by
Edward A. Wright. Atty

T. L. BURTON.
BALANCING DEVICE FOR BRAKE HEADS.
APPLICATION FILED MAR. 4, 1916.

1,199,872. Patented Oct. 3, 1916.
2 SHEETS—SHEET 2.

INVENTOR
Thomas L. Burton.
by Edward H. Wright
Atty.

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BALANCING DEVICE FOR BRAKE-HEADS.

1,199,872.   Specification of Letters Patent.   Patented Oct. 3, 1916.

Application filed March 4, 1916. Serial No. 82,038.

*To all whom it may concern:*

Be it known that I, THOMAS L. BURTON, a citizen of the United States, and a resident of St. Louis, in the State of Missouri, have invented a certain new and useful Improvement in Balancing Devices for Brake-Heads, of which improvement the following is a specification.

This invention relates to brake heads and hangers, and has for its object to provide improved connecting means whereby the brake head will be automatically adjusted upon its pivot to such position that the shoe is concentric with the wheel when applied thereto, and adapted to turn upon its pivot a certain amount relative to the hanger when releasing, and thus be maintained substantially concentric with the wheel at all times.

In the operation of railway brake shoes it is important that when released, all parts of the shoe and brake head shall be prevented from coming into contact with the wheels in order to prevent undesirable wear, loss of power and injury to the parts. This is accomplished in my present improvement by maintaining the brake shoe substantially concentric with the wheel when the brake shoe is released and swings a slight distance away from the wheel. At the same time the shoes are adapted to adjust themselves through a frictional engagement when brought into contact with the wheel, and thereby shift their position sufficiently to compensate for the wear of the shoe and wheel and maintain the concentric relation with the wheel throughout the life of the shoe.

Figure 1:
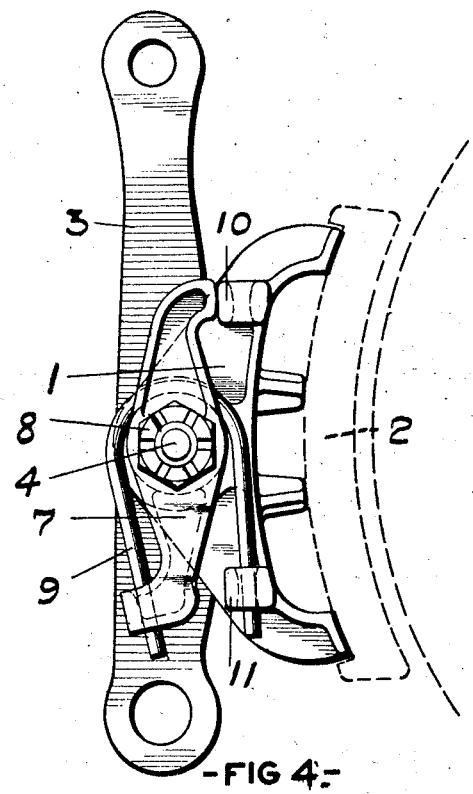
Figure 2:
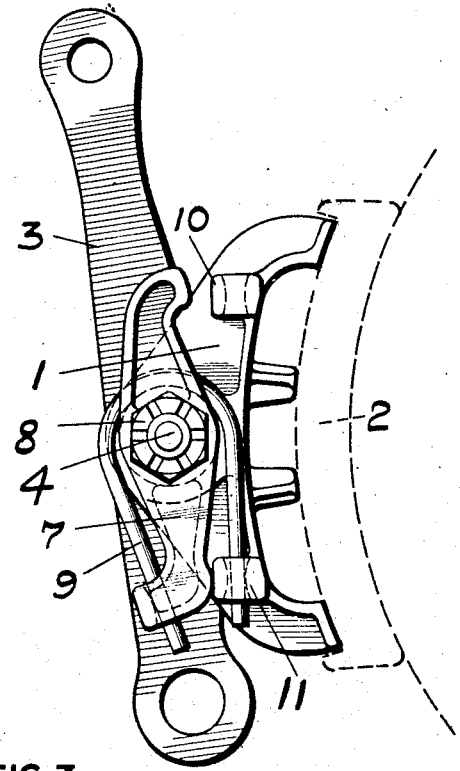
Figure 4:
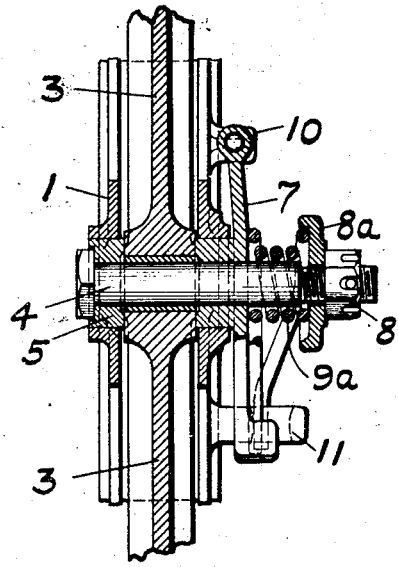
Figure 3:
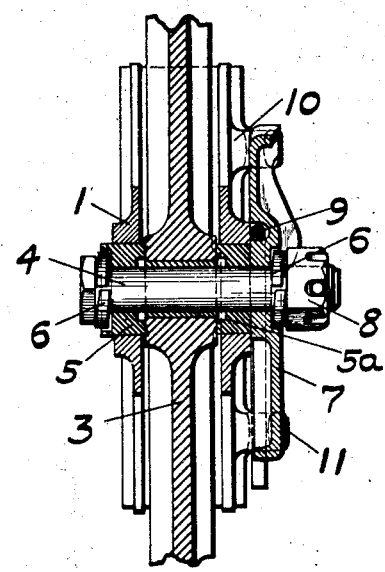
Figure 5:
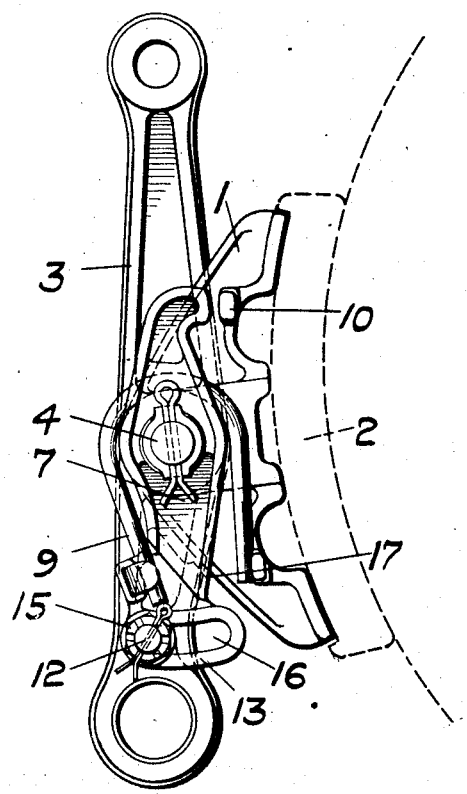
Figure 6:
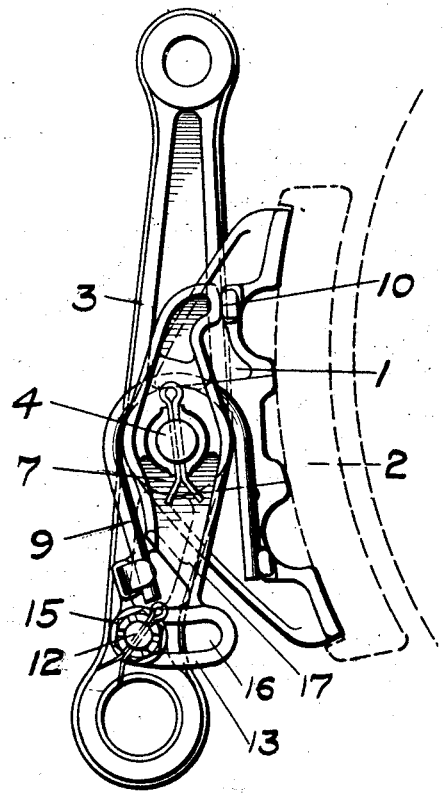
Figure 7:
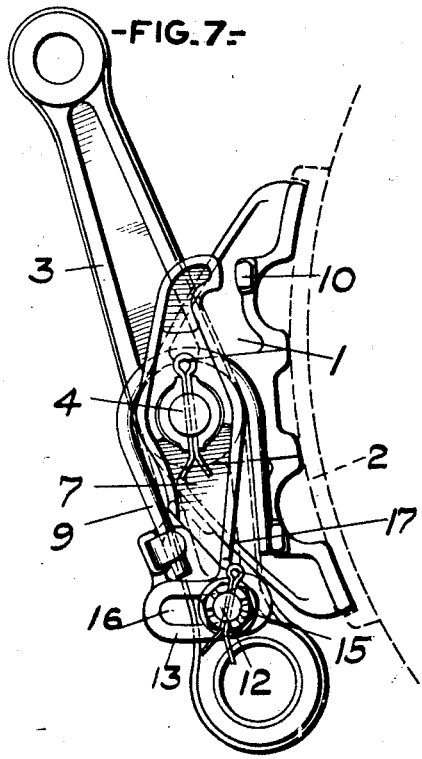
Figure 8:
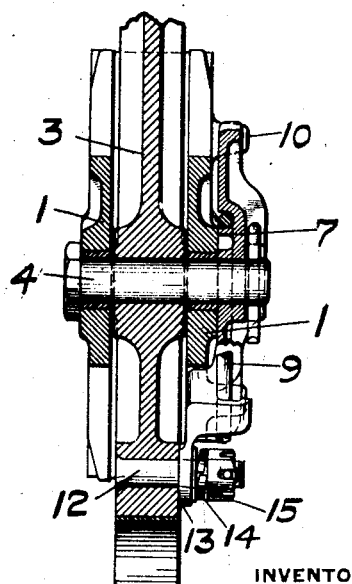

In the accompanying drawings: Figure 1 is a side elevation of a brake head and hanger embodying my improvement; the parts being indicated in the release position; Fig. 2, a similar view showing the parts in the applied position; Fig. 3, a transverse vertical section taken through the pivot connection; Fig. 4, a similar section showing a modification; Fig. 5, a side elevation similar to Fig. 2, but showing another modification, the parts being indicated with an unworn shoe in the applied position; Fig. 6, a similar view with the parts in release position; Fig. 7, a similar view, with the parts in the applied position after the shoe and wheel have become worn; and Fig. 8, a transverse vertical section of the modification shown in Figs. 5, 6 and 7.

As shown in Figs. 1, 2 and 3, the brake head, 1, carrying the shoe, 2, is pivotally mounted on the hanger, 3, by means of a pin or bolt, 4, passing through the two flanges of the brake head. According to my present improvement, a friction member such as the arm, 7, is pivotally mounted, preferably on the bolt, 4, and is adapted to have frictional engagement, directly or indirectly, with one of the parts such as the hanger, 3, and have a spring connection with the other part, such as the brake head, 1. As shown, the brake head flanges are provided with openings in which are mounted the longitudinally movable bushings, 5 and $5^a$, on the connecting bolt, 4, the arm, 7, having frictional engagement directly with the bushing, $5^a$, which bears against the hanger, 3, by means of the pressure produced by the clamping nut, 8, and spring washers, 6, on the bolt. The arm, 7, thus has frictional connection with the hanger through the intermediate bushing, $5^a$. If preferred, the bushing may be made integral with the friction arm, as indicated in Fig. 4.

A limited movement is provided between the brake head and the friction arm for the purpose of permitting the brake head to turn on its pivot relative to the hanger during the releasing action and thereby compensate for the swinging of the hanger on its support, and thus maintain the brake shoe substantially concentric with the wheel. At one extreme of this limited movement the stop lug, 10, on the brake head bears against the upper end of the arm, 7, while at the other extreme the lug, 11, engages the lower end of said arm, the connecting spring, 9, being arranged to normally tend to swing the brake head to the position in which the lug, 10, engages the upper end of the arm, as in the release position shown in Fig. 1. Any suitable form of spring or yielding resistance means may be employed for this purpose. As shown in Fig. 4, the coiled spring, $9^a$, is located on the bolt, 4, between the arm, 7, and the washer, $8^a$, and the respective ends of the spring are extended to engage the lug, 11, and the lower end of the friction arm, whereby it performs the functions of both springs, 6 and 9, of Figs. 1, 2 and 3. When the brake shoe is forced against the wheel in applying the brakes, the lug, 11, presses against the lower end of the friction arm, 7, with sufficient force to overcome the friction between the arm, 7, and the hanger, and shift the arm to such position as may be necessary to allow the shoe to take a position concentric with the wheel. During this movement, the spring, 9, is stressed a certain amount, and so remains until the brake is released. As the hanger then begins to swing away from the wheel, the spring, 9, expands and turns the brake head upon its pivot on the hanger until the lug, 10, engages the upper end of the arm, 7. This movement compensates for the swinging movement of the hanger so that in the normal release position, the brake shoe remains substantially concentric with the wheel as indicated in Fig. 1. This absolutely prevents the shoe from coming into contact with the wheel when released, and also allows for a shorter swinging movement of the hangers in applying and releasing brakes. As the shoes and wheels wear, the further movement of the hanger necessary to bring the shoe against the wheel serves to shift the friction arm as before described.

In the modification shown in Figs. 5 to 8, the frictional bushings, spring washers, and clamping nut, on the bolt are eliminated, and the frictional engagement between the arm, 7, and the hanger is obtained by means of the pin, 12, mounted in the lower part of the hanger and extending through a slotted opening, 16, in an extension, 13, at the lower end of the arm, the spring washer, 14, and clamping nut, 15, serving to press the frictional surfaces of the arm and the hanger together. Otherwise the construction is similar to that before described. When the unworn shoe is first attached to the brake head, the friction arm is turned to such position relative to the hanger that the pin, 12, is at the initial end of the slot, 16, as shown in Figs. 5 and 6. Then as the shoe and wheel wear down, the brake head presses at 17 against the friction arm, 7, when the shoe is forced against the wheel, and the arm is thereby turned a little at a time until the shoe is nearly worn out, and the pin, 12, will have reached a position at the opposite end of the slot, 16, as indicated in Fig. 7. During all positions of the friction arm relative to the hanger, however, the spring, 9, operates to swing the brake head relative to the hanger at each releasing movement of the brake shoes, and thereby maintain the same substantially concentric with the wheels throughout the life of the shoes.

In the construction shown in Figs. 5 to 8, the friction surface is at a greater distance from the axis of the pivot whereby it has an increased leverage and is more effective.

Having now described my invention, what I claim as new and desire to secure by Letters Patent is:

1. The combination of a brake hanger, a brake head pivotally connected thereto, a friction member having frictional engagement tending to prevent movement relative to the hanger, and means for producing a limited movement of the brake head relative to the hanger when the brake is released.

2. The combination of a brake hanger, a brake head pivotally connected thereto, a friction member having frictional engagement tending to prevent movement relative to the hanger, a spring between said friction member and the brake head, and a stop for limiting the movement of the brake head relative to the hanger.

3. The combination of a brake hanger, a brake head pivotally connected thereto, a friction member having frictional engagement tending to prevent movement relative to the hanger, a spring between said friction member and the brake head, means on the brake head for engaging said friction member when the shoe is applied to the wheel, and a stop to limit the movement of the brake head relative to the hanger when the brake is released.

4. The combination of a brake hanger, a bolt, a brake head pivotally mounted thereon, a friction member also pivoted on said bolt and having a frictional engagement with the hanger, and a spring between said friction member and the brake head for producing a limited movement of the brake head relative to the hanger when the brake is released.

5. The combination of a brake hanger, a bolt, a brake head pivotally mounted thereon, a friction member also pivoted on said bolt and having a frictional engagement with the hanger, said brake head having means for engaging said friction member when the shoe is applied to the wheel, a spring acting between said friction member and the brake head for producing a movement of the brake head relative to the hanger when the brake is released, and a stop to limit said movement.

6. The combination of a brake hanger, a bolt, a brake head pivotally mounted thereon, a friction arm also pivoted on said bolt and having a friction surface at one end engaging the hanger, means for exerting a pressure on said friction surface, and means for producing a limited movement of the brake head relative to the hanger when the brake is released.

7. The combination of a brake hanger, a bolt, a brake head pivotally mounted thereon, a friction arm also pivoted on said bolt and having a friction surface at one end engaging the hanger, means for exerting a pressure on said friction surface, a spring acting between said friction arm and the brake head for producing a movement of the brake head relative to the hanger when the brake is released, and a stop for limiting said movement.

8. The combination of a brake hanger, a bolt, a brake head pivotally mounted thereon, a friction arm also pivoted on said bolt and having a friction surface at one end engaging the hanger, means for exerting a pressure on said friction surface, said brake head having means for engaging said friction arm when the shoe is applied to the wheel, a spring acting between said friction arm and the brake head for producing a movement of the brake head relative to the hanger when the brake is released, and a stop for limiting said movement.

9. The combination of a brake hanger, a bolt, a brake head pivotally mounted thereon, a friction arm also pivoted on said bolt and having an extension engaging the hanger and provided with a slotted opening, a pin on said hanger extending through said slot and having a clamping nut, and means for producing a limited movement of the brake head relative to the hanger when the brake is released.

10. The combination of a brake hanger, a bolt, a brake head pivotally mounted thereon, a friction arm also pivoted on said bolt and having an extension engaging the hanger and provided with a slotted opening, a pin on said hanger extending through said slot and having a clamping nut, said brake head having means for engaging said friction arm when the shoe is applied to the wheel, a spring acting between said friction arm and the brake head for producing a movement of the brake head relative to the hanger when the brake is released, and a stop for limiting said movement.

In testimony whereof I have hereunto set my hand.

THOMAS L. BURTON.